United States Patent
Kopecek et al.

(10) Patent No.: US 10,724,494 B2
(45) Date of Patent: Jul. 28, 2020

(54) INTERNAL COMBUSTION ENGINE WITH A REGULATING DEVICE

(71) Applicant: INNIO Jenbacher GmbH & Co OG, Jenbach, Tirol (AT)

(72) Inventors: Herbert Kopecek, Schwaz (AT); Nikolaus Spyra, Innsbruck (AT); Josef Thalhauser, Nussdorf (DE)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 58 days.

(21) Appl. No.: 15/738,137

(22) PCT Filed: Jun. 17, 2016

(86) PCT No.: PCT/AT2016/050211
§ 371 (c)(1),
(2) Date: Dec. 20, 2017

(87) PCT Pub. No.: WO2017/000008
PCT Pub. Date: Jan. 5, 2017

(65) Prior Publication Data
US 2018/0180015 A1 Jun. 28, 2018

(30) Foreign Application Priority Data
Jun. 29, 2015 (AT) .................................. A 412/2015

(51) Int. Cl.
*F02P 5/04* (2006.01)
*F02B 37/18* (2006.01)
(Continued)

(52) U.S. Cl.
CPC .............. *F02P 5/045* (2013.01); *F02B 37/18* (2013.01); *F02B 37/183* (2013.01);
(Continued)

(58) Field of Classification Search
CPC .. F02P 5/045; F02P 5/1528; F02P 5/15; F02P 5/1502; F02P 5/1516; Y02T 10/144; F02B 37/18; F02B 37/183; F02D 41/0007; F02D 41/1406; F02D 41/2422; F02D 43/00; F02D 43/02; F02D 43/04

USPC ........ 60/600, 601, 602, 603, 605.1; 123/383, 123/339.11

See application file for complete search history.

(56) References Cited

U.S. PATENT DOCUMENTS 4,467,607 A 8/1984 Rydquist et al.
4,485,626 A 12/1984 Moriguchi et al.
(Continued)

FOREIGN PATENT DOCUMENTS

DE 197 33 763 A1 2/1999
DE 100 49 908 A1 4/2002
(Continued)

OTHER PUBLICATIONS

Office Action and Search issued in connection with corresponding AT Application No. ATA412/2015 dated Mar. 9, 2016.
(Continued)

*Primary Examiner* — Mark A Laurenzi
*Assistant Examiner* — Mickey H France
(74) *Attorney, Agent, or Firm* — Fletcher Yoder, P.C.

(57) ABSTRACT

Internal combustion engine with a regulating device and at least one ignition device for igniting a fuel-air mixture in a piston/cylinder unit, whereby on the outlet side of the piston-cylinder unit, a turbocharger and a wastegate are provided, whereby via the wastegate an exhaust-gas turbine of the turbocharger can be flowed through, and whereby the exhaust-gas turbine drives a compressor arranged on the intake side of the piston-cylinder unit, whereby the regulating device, on detecting a predefined triggering condition, performs an adjustment of the ignition time and the opening degree of the wastegate, such that that the overall efficiency of the internal combustion engine is optimized, whereby the ignition time of the ignition device is brought by the regulating device to the optimal overall efficiency, and the opening degree of the wastegate is changed to provide the required output power of the internal combustion engine.

18 Claims, 2 Drawing Sheets

(51) Int. Cl.
    *F02D 41/24*     (2006.01)
    *F02D 41/00*     (2006.01)
    *F02D 41/14*     (2006.01)
    *F02P 5/15*     (2006.01)

(52) U.S. Cl.
    CPC ..... *F02D 41/0007* (2013.01); *F02D 41/1406* (2013.01); *F02D 41/2422* (2013.01); *F02P 5/15* (2013.01); *Y02T 10/144* (2013.01)

(56) References Cited

U.S. PATENT DOCUMENTS

| | | |
|---|---|---|
| 4,496,286 A | 1/1985 | Gagnon |
| 2016/0047323 A1* | 2/2016 | Suzuki ................ F02P 5/1502 60/285 |

FOREIGN PATENT DOCUMENTS

| | | |
|---|---|---|
| FR | 2 500 066 A1 | 8/1982 |
| JP | S59-93966 A | 5/1984 |
| SE | 8 200 928 L | 8/1982 |

OTHER PUBLICATIONS

Office Action and Search issued in connection with corresponding AT Application No. ATA412/2015 dated May 20, 2016.
Machine translation and International Preliminary report on Patentability issued in connection with corresponding PCT Application No. PCT/AT2016/050211 dated Jan. 2, 2018.

* cited by examiner

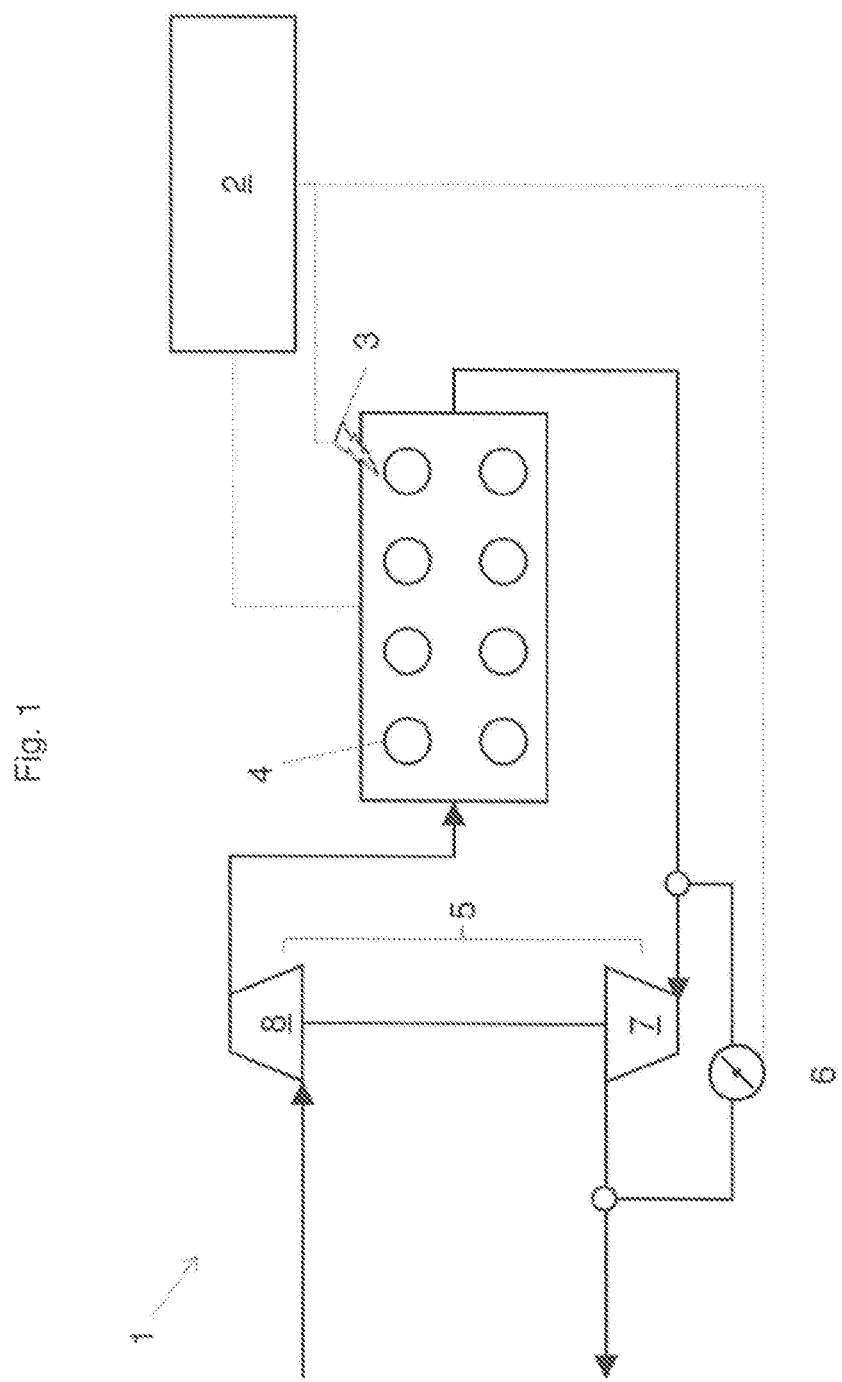

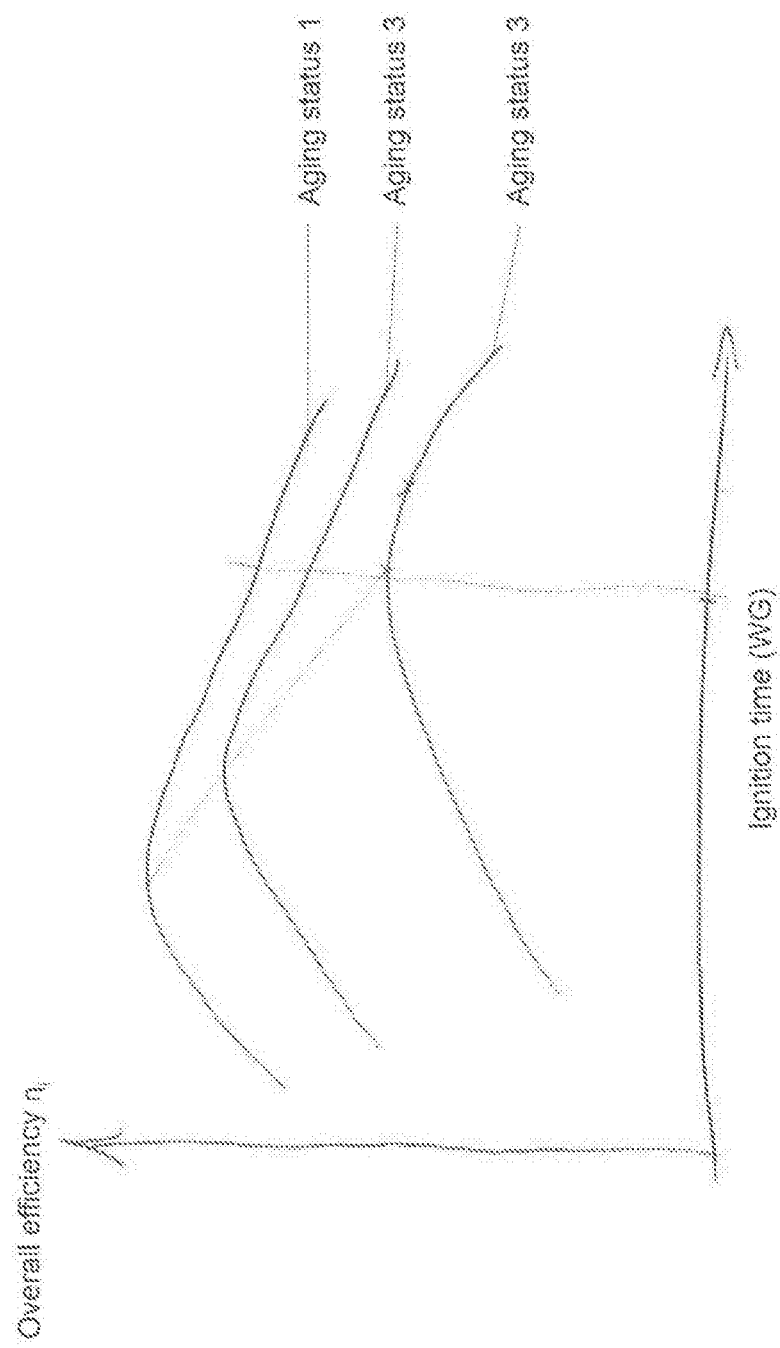

INTERNAL COMBUSTION ENGINE WITH A REGULATING DEVICE

BACKGROUND

In generic internal combustion engines, the turbocharger is used to obtain energy from the exhaust gas of the piston-cylinder unit(s) and convert it into compression work for the propellant-air mixture supplied to the piston-cylinder unit(s). An adjustment of the ignition timing is used to influence the position of center of gravity of the combustion in the individual piston-cylinder units of the internal combustion engine.

The combustion center of gravity means the state in which half of the fresh charge is combusted and is expressed by the corresponding crankshaft angle. This is also known as MFB 50, i.e. 50% of the mass fraction burned (MFB). For the terms, reference is made to textbooks on internal combustion engines. See, in particular, Heywood, John B., Internal Combustion Engine Fundamentals, New York, McGraw-Hill, 1988.

The combustion center of gravity influences the combustion efficiency of the internal combustion engine and the amount of emissions generated.

It is also known that the power of the internal combustion engine can be regulated via targeted flushing of exhaust gases around the exhaust turbine of the turbocharger by means of the variable opening degree of a wastegate. This is also evident from U.S. Pat. No. 4,496,286 A. By increasing the opening of the wastegate, an increased free flow cross-section is offered to the exhaust gases of the piston-cylinder units, whereby the exhaust-gas pressure against which the pistons of the piston-cylinder units must work is lowered.

A disadvantage of this is that the mentioned regulating operations (change of the ignition timing and change in the opening degree of the wastegate) influence the different degrees of efficiency of the internal combustion engine individually, namely the combustion efficiency (also referred to as "high-pressure efficiency" in the literature) and the load change efficiency (referred to as "low-pressure efficiency" in the literature).

BRIEF DESCRIPTION OF THE INVENTION

In preparation for the discussion of an embodiment of the invention, we first consider two extreme cases with regard to the opening degree of the wastegate.

Wastegate Fully Closed:

The entire exhaust gas of all piston-cylinder units or selected groups (e.g. a cylinder bank) flows through the exhaust-gas turbine, which causes very high charging of the piston-cylinder units of the internal combustion engine via the compressor connected to the exhaust-gas turbine. Due to the high compression of the propellant-air mixture, both the pressure of the propellant-air mixture upstream of the intake valves (charge-air pressure) and the mass flow which can be introduced into the piston-cylinder units increase. When the output of the internal combustion engine is constant, a leaner propellant-air mixture can be used, whereby an earlier ignition timing can be selected at constant NOx emissions, which in turn increases the combustion efficiency.

On the other hand, the pistons of the piston-cylinder units must work against the very high counter-pressure of the exhaust-gas turbine, which reduces the load change efficiency.

Wastegate Opened to the Maximum:

A maximum possible amount of exhaust gas from all piston-cylinder units or selected groups (e.g. a cylinder bank) is routed via the wastegate around the exhaust-gas turbine, so that only a small impulse of the compressor takes place through the exhaust-gas turbine. The piston must perform less load change work, but at the expense of lower charging (lower charge-air pressure). When the output of the internal combustion engine is constant, a richer propellant-air mixture must be used, whereby a later ignition timing must be selected to prevent an increase in NOx emissions, which in turn reduces the combustion efficiency. On the other hand, the pistons of the piston-cylinder units must only work against a very low counter-pressure of the exhaust-gas turbine, which increases the load change efficiency.

The overall efficiency of the internal combustion engine (also referred to in the literature as "internal efficiency") is a product of various factors, two of which are the combustion efficiency and the load change efficiency. The remaining factors are not affected by the invention and therefore can be regarded as constant in this disclosure.

The object of an embodiment is to provide a generic internal combustion engine whose overall efficiency is optimized when the ignition timing is changed.

According to an embodiment of the invention, the ignition timing of the ignition device of the at least one piston-cylinder unit and the wastegate between the two extremes discussed above are set such that, for each operating state of the internal combustion engine, the highest overall efficiency can be achieved. There occurs, as it were, a two-variable optimization. According to an embodiment of the invention, we proceed so that the ignition timing of the ignition device is brought to the optimal overall efficiency by the regulating device, and the opening degree of the wastegate is changed to provide the required output power of the internal combustion engine.

If an isolated operation by the regulating device were performed on the ignition device without taking account of the opening degree of the wastegate, which changes the ignition timing so as to optimize the combustion efficiency (one-variable optimization), this would lead, without a regulating operation according to an embodiment of the invention, to a suboptimal overall efficiency of the internal combustion engine.

In order to counteract this, according to an embodiment of the invention, both the ignition timing and the opening degree of the wastegate are changed such that the overall efficiency is optimized as a function of the combustion efficiency and load change efficiency.

It may be advantageous, over the service life of an internal combustion engine, to adjust the ignition timing of the ignition device of the individual piston-cylinder units and the opening degree of the wastegate to compensate as far as possible for aging effects on the overall efficiency of the internal combustion engine and maximize the overall efficiency over the service life of the internal combustion engine. Such measures may also require taking account of changed environmental influences (e.g. ambient temperature and pressure).

A predefined triggering condition may be ambient influences and/or an aging state of the internal combustion engine.

Aging of the internal combustion engine means, for example, an actuation characteristic of the intake and outlet valves modified by wear or deposits, a load change modified by deposits, combustion chamber deposits, etc.

In addition, or alternatively, measurement results for internal states of the internal combustion engine—in an embodiment ignition delay and/or contamination of the turbocharger—can be stored as the predefined triggering conditions.

In an embodiment, the adjustment of the ignition timing is slow and the actuation of the wastegate is fast.

The ignition timing and the opening degree of the wastegate can be changed simultaneously.

There is thus a functional relationship between the ignition timing, the opening degree of the wastegate and the overall efficiency.

The functional relationship can be stored in the regulating device, in an embodiment in the form of a characteristic map. Alternatively, the regulating device can calculate at least parts of the functional relationship itself via a simulation during operation. Alternatively, the trial-and-error method described below can be used.

In practice, an internal combustion engine has a plurality of piston-cylinder units, and each piston-cylinder unit is assigned to an ignition device which can be controlled separately by the regulating device, such that the ignition timing can be selected individually for each piston-cylinder unit. In practice, usually only one wastegate is provided for the entire internal combustion engine or one wastegate per cylinder bank. In the latter case, the regulating device can influence the opening degree of each wastegate individually.

In a simplified form, the same ignition timing or a common MFB50 value is selected for all piston-cylinder units. This is a prerequisite for the reduction of the view to only three dimensions.

Particularly in an embodiment is a design of the internal combustion engine, in particular a stationary gas engine, which in an embodiment serves as part of a genset for generating electrical energy.

BRIEF DESCRIPTION OF THE DRAWINGS

Further advantages and details of the invention are discussed with reference to the figures. The figures are as follows:

FIG. 1 a schematic representation of an internal combustion engine,

FIG. 2 a representation of the overall efficiency over the ignition timing of an internal combustion engine for different aging conditions.

DETAILED DESCRIPTION OF THE INVENTION

A schematically illustrated internal combustion engine 1 with a plurality of piston-cylinder units 4 and a regulating device 2 can be seen in FIG. 1. A turbocharger 5 is provided which has an exhaust-gas turbine 7 on the outlet side of the piston-cylinder units 4 and a compressor 8 on the inlet side of the piston-cylinder units 4. The amount of exhaust gas which flows around the exhaust-gas turbine 7 and thus does not contribute to a drive of the compressor 8 can be adjusted by engaging the regulating device 2 on a wastegate 6.

Each piston-cylinder unit 4 is assigned to an ignition device 3 for igniting a propellant-air mixture in the respective piston-cylinder unit 4. The ignition timing of the ignition device 3 can be adjusted by the regulating device 2.

The regulating device 2 can be designed as part of an overall control of the internal combustion engine 1 or as a separate unit.

FIG. 2 shows a 2D representation of a family of curves, whereby the family is shown for a constant power and a constant NOx emission, whereby each curve shows the overall efficiency $\eta_i$ of the internal combustion engine 1 for a specific aging state and for certain boundary conditions (e.g. ambient pressure, ambient temperature). The curves are designated as aging state 1, aging state 2, and aging state 3.

The overall efficiency $\eta_i$ of the internal combustion engine 1 is plotted as a function of the independent actuating variables of the ignition timing and the opening degree of the wastegate WG. In the illustration, the ignition timing is plotted as a variable on the x-axis. This does not mean that the opening degree of the wastegate WG is kept constant. Instead, a specific opening degree of the wastegate WG results for each ignition timing.

By selecting a specific ignition timing (and thus the setting of the opening degree of the wastegate WG resulting from this choice), the family results in a defined overall efficiency $\eta_i$ for each curve. This makes it possible to determine the ignition timing which gives the optimal overall efficiency $\eta_i$ for this curve of the family. It can be seen that this optimal overall efficiency $\eta_i$ for each curve of the family is at a different ignition timing.

The optimal overall efficiency $\eta_i$ for given boundary conditions/aging state can be found e.g. via a stored routine, after which the internal combustion engine 1 changes the ignition timing at a specific operating point and, as a function thereof, measures the amount of propellant gas necessary to provide the required power, and compares this to the amount of propellant gas required before the ignition timing was adjusted.

If the amount of propellant gas required after the adjustment of the ignition timing is less than that required before the adjustment, a higher overall efficiency is present than before and vice versa.

Thus, the internal combustion engine can arrive at an optimal overall efficiency by means of a trial-and-error method. For this purpose, search algorithms for finding a maximum, known to a person skilled in the art, can be used.

By knowing the opening characteristic(s) of the gas valves, it is not necessary to access the measured values for the metered fuel amount, but the metered gas amounts can be deduced from the opening characteristic(s) of the gas valves.

The overall efficiency $\eta_i$ is a function of the load change efficiency $\eta_{LW}$ and the combustion efficiency $$\eta_i = f_1(\eta_{LW}, \eta_V)$$

The load change efficiency $\eta_{LW}$ is in turn a function of a supercharging efficiency $\eta_{ATL}$, the exhaust-gas temperature T3 and the opening degree WG of the wastegate 6:

$$\eta_{LW} = f_2(\eta_{ATL}, T_3, WG)$$

The combustion efficiency liv is a function of the ignition timing, whereby the ignition timing can be expressed as the combustion center of gravity MFB50:

$$\eta_V = f_3(MFB50)$$

It must be mentioned that a known relationship exists between the exhaust-gas temperature T3 and the ignition timing. The supercharging efficiency $\eta_{ATL}$ is present for each turbocharger in the form of two characteristic maps, namely as a characteristic map for the exhaust-gas turbine 7 and a characteristic map for the compressor 8.

Since the individual functions f1, f2, f3 are known and accessible to a person skilled in the art, using a customary simulation software, such as GT Power® from Gamma Technologies GmbH, a 2D representation (shown in simplified form in FIG. 2) can be created, whereby the overall efficiency $\eta_i$ of the internal combustion engine 1 is plotted via the two independent actuating variables: the ignition timing and the opening degree of the wastegate WG.

In practice, however, the two actuating variables are subject to boundary conditions, namely a predetermined power to be output by the internal combustion engine and a predetermined NOx emission. This means that a "migration" in the landscape stretched by the overall efficiency cannot take place along any arbitrary path, but only along selected paths, which can change depending on different variables (e.g. aging state of the internal combustion engine, environmental influences, etc.). The regulating device "migrates" on the path possible at the time of the regulating operation, up to the maximum overall efficiency which lies along the path, by changing the actuating variables of ignition timing and opening degree of the wastegate, taking into account the boundary conditions.

What we claim is:

1. An internal combustion engine comprising:
    a regulating device and at least one ignition device for igniting a fuel-air mixture in at least one piston/cylinder unit, wherein on the outlet side of the at least one piston-cylinder unit, a turbocharger and
    a wastegate are provided, wherein via the wastegate can be flowed through, and wherein the exhaust-gas turbine drives a compressor arranged on the intake side of the at least one piston-cylinder unit, wherein the regulating device, on detecting a predefined triggering condition, the predefined triggering condition comprising an operating age of the internal combustion engine, performs an adjustment of the ignition time and the opening degree of the wastegate, such that that the overall efficiency of the internal combustion engine is optimized,
    wherein the ignition time of the ignition device is brought by the regulating device to the optimal overall efficiency, and the opening degree of the wastegate is changed to provide output power of the internal combustion engine, wherein the regulating device performs the adjustment of the ignition time and the opening degree of the wastegate by changing the opening degree of the wastegate for every different ignition time based on an application of an overall efficiency versus ignition time curve.

2. The internal combustion engine of claim 1, wherein environmental influences of the internal combustion engine are stored as predefined triggering conditions.

3. The internal combustion engine of claim 1, wherein measurement results of internal states of the internal combustion engine are stored as the predefined triggering conditions.

4. The internal combustion engine of claim 1, wherein the ignition time of the ignition device and the opening degree of the wastegate are simultaneously brought to the optimal overall efficiency by the regulating device.

5. The internal combustion engine of claim 1, wherein the overall efficiency of the internal combustion engine is derived via a plurality of overall efficiency versus ignition time curves.

6. The internal combustion engine of claim 5, wherein each of the plurality of overall efficiency versus ignition time curves comprise a different aging status.

7. The internal combustion engine of claim 6, wherein the adjustment of the ignition time and the opening degree of the wastegate comprises an application of one of the plurality of overall efficiency versus ignition time curves whose aging status more closely matches the operating age of the internal combustion engine.

8. The internal combustion engine of claim 5, wherein the plurality of overall efficiency versus ignition time curves comprise optimal overall efficiency $\eta_i$ derived as a function of a load change efficiency $\eta_{LW}$ and a combustion efficiency $\eta_v$.

9. The internal combustion engine of claim 8, wherein the function of the load change efficiency $\eta_{LW}$ comprises $\eta_{LW}=f(\eta_{ATL}, T_3, WG)$, where $\eta_{ATL}$ comprises a supercharging efficiency, $T_3$ comprises an exhaust gas temperature, and WG comprises the opening degree of the wastegate.

10. A method for operating an internal combustion engine, comprising:
    detecting a predefined triggering condition, the predefined triggering condition comprising an operating age of the internal combustion engine; and
    adjusting, via a regulating device, an ignition time and an opening degree of a wastegate based on the predefined triggering condition to improve overall efficiency of the internal combustion engine, wherein the wastegate is included in an exhaust-gas turbine of a turbocharger of the internal combustion engine, and wherein the opening degree of the wastegate is adjusted to provide output power of the internal combustion engine, wherein the overall efficiency of the internal combustion engine is derived via a plurality of overall efficiency versus ignition time curves.

11. The method of claim 10, wherein each of the plurality of overall efficiency versus ignition time curves comprise a different aging status.

12. The method of claim 11, wherein adjusting, via the regulating device, the ignition time and the opening degree of the wastegate comprises selecting one of the plurality of overall efficiency versus ignition time curves whose aging status more closely matches the operating age of the internal combustion engine.

13. The method of claim 10, wherein the plurality of overall efficiency versus ignition time curves comprise an optimal overall efficiency $\eta_i$ derived as a function of a load change efficiency $\eta_{LW}$ and a combustion efficiency $\eta_v$.

14. A system, comprising:
    a control system configured to:
    detect a predefined triggering condition, the predefined triggering condition comprising an operating age of the internal combustion engine; and
    adjust, via a regulating device, an ignition time and an opening degree of a wastegate based on the predefined triggering condition to improve overall efficiency of the internal combustion engine, wherein the wastegate is included in an exhaust-gas turbine of a turbocharger included in the internal combustion engine, and wherein the opening degree of the wastegate is adjusted to provide output power of the internal combustion engine, wherein the control system is configured to derive the overall efficiency of the internal combustion engine via a plurality of overall efficiency versus ignition time curves.

15. The system of claim 14, wherein each of the plurality of overall efficiency versus ignition time curves comprise a different aging status.

16. The system of claim 15, wherein the control system is configured to adjust, via the regulating device, the ignition time and the opening degree of the wastegate by selecting one of the plurality of overall efficiency versus ignition time curves whose aging status more closely matches the operating age of the internal combustion engine.

17. The system of claim 14, wherein the plurality of overall efficiency versus ignition time curves comprise an optimal overall efficiency $\eta_i$ derived as a function of a load change efficiency $\eta_{LW}$ and a combustion efficiency $\eta_v$.

18. An internal combustion engine comprising:
   a regulating device and at least one ignition device for igniting a fuel-air mixture in at least one piston/cylinder unit, wherein on the outlet side of the at least one piston-cylinder unit, a turbocharger and
   a wastegate are provided, wherein via the wastegate can be flowed through, and wherein the exhaust-gas turbine drives a compressor arranged on the intake side of the at least one piston-cylinder unit, wherein the regulating device, on detecting a predefined triggering condition, the predefined triggering condition comprising an operating age of the internal combustion engine, performs an adjustment of the ignition time and the opening degree of the wastegate, such that that the overall efficiency of the internal combustion engine is optimized,
wherein the ignition time of the ignition device is brought by the regulating device to the optimal overall efficiency, and the opening degree of the wastegate is changed to provide output power of the internal combustion engine, wherein the overall efficiency of the internal combustion engine is derived via a plurality of overall efficiency versus ignition time curves.

* * * * *